US009363941B2

(12) United States Patent
Patwardhan et al.

(10) Patent No.: US 9,363,941 B2
(45) Date of Patent: Jun. 14, 2016

(54) CLOSING WHEEL EQUALIZER

(71) Applicant: AGCO Corporation, Hesston, KS (US)

(72) Inventors: Ranjit Patwardhan, Hesston, KS (US); Monte Rans, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/993,210

(22) Filed: Jan. 12, 2016

(65) Prior Publication Data
US 2016/0120096 A1 May 5, 2016

Related U.S. Application Data

(63) Continuation of application No. 14/369,286, filed on Jun. 27, 2014.

(51) Int. Cl.
*A01C 5/06* (2006.01)
*A01B 35/28* (2006.01)

(52) U.S. Cl.
CPC ................. *A01C 5/066* (2013.01); *A01B 35/28* (2013.01)

(58) Field of Classification Search
CPC ........ A01C 5/066; A01C 5/068; A01C 7/203; A01B 35/28
USPC .......................................... 111/190, 193, 195
See application file for complete search history.

(56) References Cited

U.S. PATENT DOCUMENTS

| | | | | | |
|---|---|---|---|---|---|
| 757,999 | A | * | 4/1904 | Davis ..................... | A01C 5/068 122/95.1 |
| 2,729,929 | A | * | 1/1956 | Mason .................... | A01B 5/06 172/579 |
| 4,404,918 | A | * | 9/1983 | Whalen .................. | A01C 5/068 111/137 |
| 4,407,207 | A | * | 10/1983 | Dreyer .................... | A01C 5/06 111/136 |
| 4,519,325 | A | * | 5/1985 | Miller ..................... | A01C 5/06 111/164 |
| 4,519,460 | A | * | 5/1985 | Gust ...................... | A01B 49/027 111/136 |
| 4,846,084 | A | * | 7/1989 | Sigle ...................... | A01C 5/06 111/136 |
| 4,974,684 | A | * | 12/1990 | Stevens ................. | A01B 73/046 172/311 |
| 5,339,906 | A | * | 8/1994 | Fox ........................ | A01B 63/22 172/4 |
| 5,782,307 | A | * | 7/1998 | Forsyth ................. | A01C 23/025 172/156 |
| 5,884,711 | A | * | 3/1999 | Shoup .................... | A01C 5/068 111/137 |

(Continued)

Primary Examiner — Matthew D Troutman

(57) ABSTRACT

A furrow closing apparatus is used with a planter that opens a furrow and deposits seeds as the planter moves in a forward direction over the ground. The furrow closing apparatus includes a frame attached to the planter and first and second closing wheels rotatably mounted on respective first and second closing wheel axles. A pivot axle extends from the frame generally transverse to the direction of travel of the planter and an equalizer bracket pivotably connected to the pivot axle. The equalizer bracket receives the first closing wheel axle in a position aft of the pivot axle and receives the second closing wheel axle in a position forward of the pivot axle such that the equalizer bracket pivots as the closing wheels traverse uneven ground to cause the first closing wheel and the second closing wheel to apply a substantially equal force in closing the furrow.

5 Claims, 3 Drawing Sheets

(56) References Cited

U.S. PATENT DOCUMENTS

| | | | | |
|---|---|---|---|---|
| 5,957,217 A * | 9/1999 | Gunnink | A01B 35/16 172/166 |
| 6,148,747 A * | 11/2000 | Deckler | A01C 5/06 111/137 |
| 6,314,897 B1 * | 11/2001 | Hagny | A01C 5/064 111/192 |
| 6,578,502 B1 * | 6/2003 | Barnstable | A01B 35/16 111/164 |
| 7,044,070 B2 * | 5/2006 | Kaster | A01C 7/006 111/62 |
| 7,946,232 B2 * | 5/2011 | Patwardhan | A01C 7/203 111/135 |
| 8,047,301 B2 * | 11/2011 | Friggstad | A01C 7/203 111/163 |
| 8,356,563 B2 * | 1/2013 | Schaffert | A01C 5/064 111/121 |
| 8,863,857 B2 * | 10/2014 | Bassett | A01C 5/06 111/136 |
| 9,032,886 B2 * | 5/2015 | Anderson | A01C 5/066 111/193 |
| 2003/0015328 A1 * | 1/2003 | Prairie | A01C 5/06 172/558 |
| 2005/0155536 A1 * | 7/2005 | Wendte | A01C 5/068 111/200 |
| 2009/0056962 A1 * | 3/2009 | Martin | A01C 5/066 172/551 |
| 2010/0096149 A1 * | 4/2010 | Friggstad | A01C 7/203 172/574 |
| 2012/0261149 A1 * | 10/2012 | Schmidt | A01C 5/064 172/558 |

* cited by examiner

CLOSING WHEEL EQUALIZER

CROSS REFERENCE TO RELATED APPLICATIONS

This application is a continuation of U.S. application Ser. No. 14/369,286, filed Jun. 27, 2014, which claims priority to U.S. Provisional Application No. 61/580,355 filed Dec. 27, 2011, entitled "CLOSING WHEEL EQUALIZER".

BACKGROUND OF THE INVENTION

1. Field of Invention

This invention relates generally to a furrow closing mechanism on agricultural planters, and more particularly to a planter having furrow closing wheels that exert near uniform force to close the furrow at multiple planting depths and ground conditions.

2. Description of Related Art

Planters with a plurality of seed meters may plant seeds upon or in the ground at various depths and spacings. A furrow opener, such as a double-disc opener having a pair of downwardly and slightly forwardly converging discs, creates a furrow in the soil for receiving seeds dropped through a dispensing tube. Gauge wheels provide support for the planter and limit the depth of penetration of the furrow opener into the ground. A pair of closing wheels attached at the rear of the planter closes the seed furrow after the seeds have been deposited therein.

One of the closing wheels may be positioned closer to the front of the planter than the other of the closing wheels. Depending on the planting depth, only one of the closing wheels may touch the ground. This exerts unequal force on the closing wheels and hence one side of the furrow will have more sidewall compaction that the other side. This may lead to undesirable sidewall compaction on one side or an open furrow after the seed is placed.

It would therefore be desirable to have a closing wheel arrangement that exerts a more equal force with each wheel to reduce non-uniform sidewall compaction and consistent closing of the furrow.

SUMMARY OF THE INVENTION

In one embodiment, the invention is directed to a furrow closing apparatus for use with an agricultural planter that opens a furrow in the ground and deposits seeds in the furrow as the planter moves in a forward direction of travel over the ground. The furrow closing apparatus includes a frame attached to the planter and first and second closing wheels rotatably mounted on respective first and second closing wheel axles. The furrow closing apparatus also includes a pivot axle extending from either side of the frame generally transverse to the direction of travel of the planter and an equalizer bracket pivotably connected to the pivot axle. The equalizer bracket receives the first closing wheel axle in a position aft of the pivot axle and receives the second closing wheel axle in a position forward of the pivot axle such that the equalizer bracket pivots as the closing wheels traverse uneven ground to cause the first closing wheel and the second closing wheel to apply a substantially equal force in closing the furrow. The equalizer bracket has first and second sidewalls, wherein each of the first and second sidewalls has a lock pin opening having a shape with elongated slot portions and a larger-diameter center hole portion in between the elongated slot portions. The furrow closing apparatus also includes a lock pin having a sleeve along a portion of the lock pin. The sleeve hays a diameter sized to fit into the larger center hole portions but too large to fit into the elongated slot portions of the lock pin openings in the first and second sidewalls. The lock pin passes through aligned openings in the first and second sides of the frame and also passes through the pin openings in the first and second sidewalls of the equalizer bracket. The lock pin is configured to lock the equalizer bracket by moving the sleeve such that the sleeve is positioned in the larger center hole portion in at least one of the first and second sidewalls.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXAMPLE EMBODIMENTS

Figure 1:
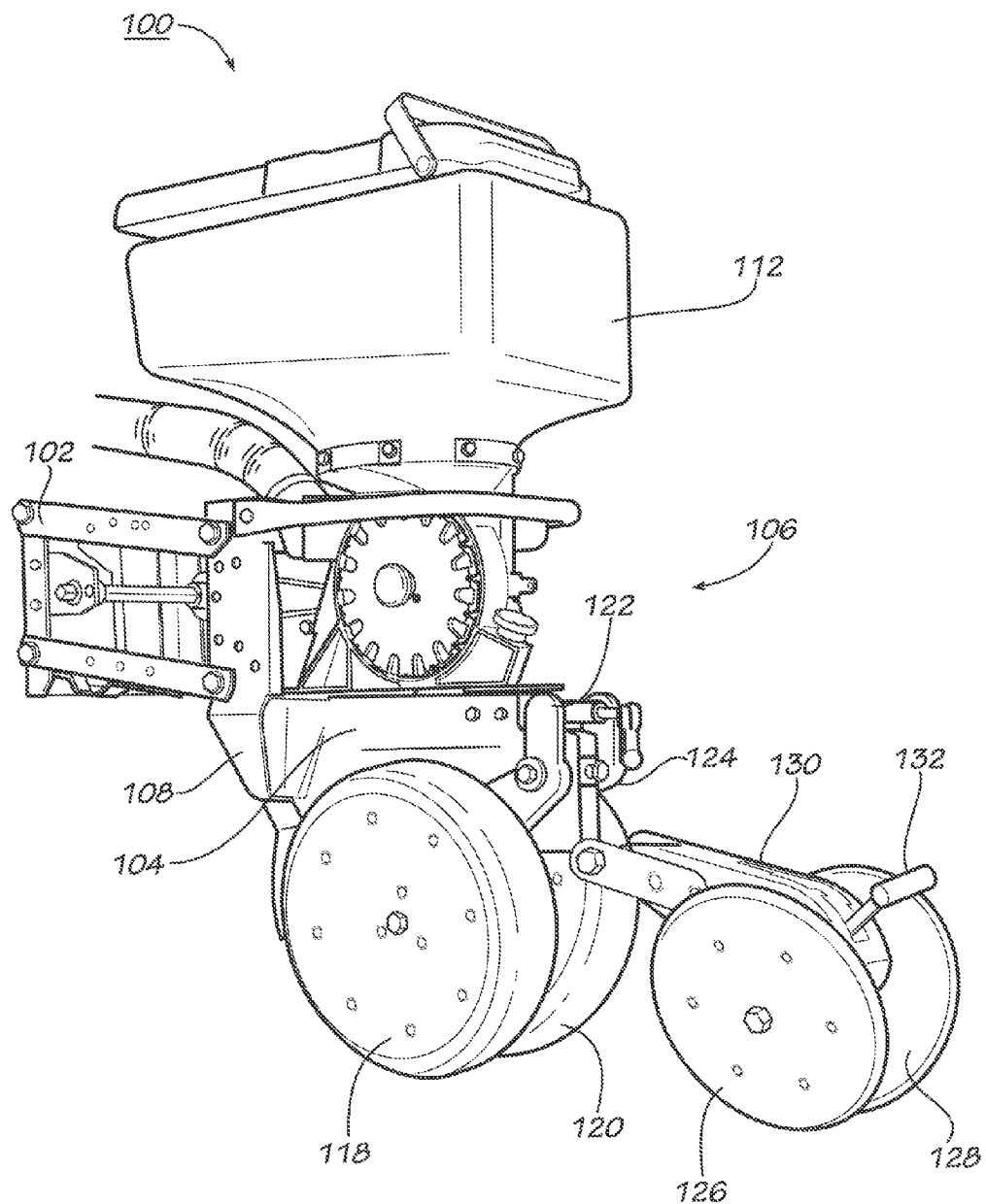
FIG. 1 is a diagram of a single row planter.

The following description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following example embodiments do not limit the disclosure. Instead, the proper scope is defined by the appended claims.

Planters may be used within an agricultural environment to facilitate placing seed and fertilizer in the ground. The planter may be connected to a tractor and have seed/fertilizer hoppers. The planter may create a furrow for the seed/fertilizer. The planter may use gauge wheels to set the depth of the furrow. After the seed or fertilizer is placed in the furrow, the planter may close the furrow with closing wheels.

While the drawings illustrate and the specification describes certain embodiments, it is to be understood that such disclosure is by way of example only. There is no intent to limit the principles disclosed to the particular disclosed embodiments. References hereinafter made to certain directions, such as, for example, "front" and "rear" are made as viewed from the side of a planter.

FIG. 1 illustrates a planter 100. Planter 100 may be a single row planter adapted for mounting on a hitch of a tractor or may comprise a pull-type implement with its own set of transport wheels. Planter 100 may include some suitable attachment mechanism for attaching it to a tool bar (not shown). An example of such an attachment mechanism comprises a four-bar linkage 102 and a pair of U-bolts (not shown) for fastening linkage 102 to the tool bar. Planter 100 may comprise a frame 104 attached to and projecting rearwardly from linkage 102. Frame 104 may comprise a number of components mounted thereon as hereinafter explained.

As shown in FIG. 1, planter 100 may include frame 104 and an input meter 106 attached to the frame 104. The planter 100 may include a horse collar 108 for further securing planter 100 to the tool bar and for protecting meter 106. Planter 100 may be powered or driven by individual mechanical, electrical, hydraulic or pneumatic motors. One or more planters 100 may be driven by a common motor. For example, planter 100 may be powered by a hydraulic drive or motor that powers a main line shaft of planter 100. Alternatively, planter 100 may be driven by a transmission where planter 100's wheels contacting the ground drive the main line shaft.

For each meter 106, the frame 104 of planter 100 may carry a generally upright dispensing tube 110 and may be adapted for receiving inputs such as seeds from meter 106. Meter 106 may receive seeds from a source of supply, such as a seed box or hopper 112 that may also be mounted on frame 104. Seeds that are received by meter 106 from hopper 112 may be singulated and dropped through dispensing tube 110 for deposit into the ground as planter 100 advances.

As is known in the art, a suitable furrow opener (not shown) may also be carried by frame 104 for opening a furrow in the soil for receiving seeds dropped through a dispensing tube. The furrow opener may take a variety of different forms. For example, the furrow opener may take the form of a double-disc opener having a pair of downwardly and slightly forwardly converging discs rotatably mounted on frame 104. The dispensing tube may project downwardly between the pair of discs and may have a lower discharge end facing generally rearwardly and downwardly to discharge the seeds into the furrow.

A first gauge wheel 118 and a second gauge wheel 120 may be disposed on opposite sides and may be rotatably mounted on frame 104, via a first gauge wheel arm assembly 122 and a second gauge wheel arm assembly 124, and may provide support for frame 104. The first and second gauge wheels 118, 120 may limit the depth of penetration of the furrow opener into the ground. Frame 104 may swing up and down relative to the tool bar via a four-bar linkage 102, and the downward movement may be limited by first and second gauge wheels 118, 120 as they roll along the ground. A pair of closing wheels 126 and 128 may be attached to the rear of frame 104 and may function to close the seed furrow after seeds have been deposited therein by dispensing tube 110. First and second closing wheels 126, 128 may be attached to planter 100 by a second frame 130. The vertical position of first gauge wheel 118 and second gauge wheel 120 relative to frame 104 and the furrow opener may be adjusted. One of the closing wheels 126, 128 may be positioned closer to the front of the planter 100 than the other of the closing wheels 128, 126.

Figure 2:
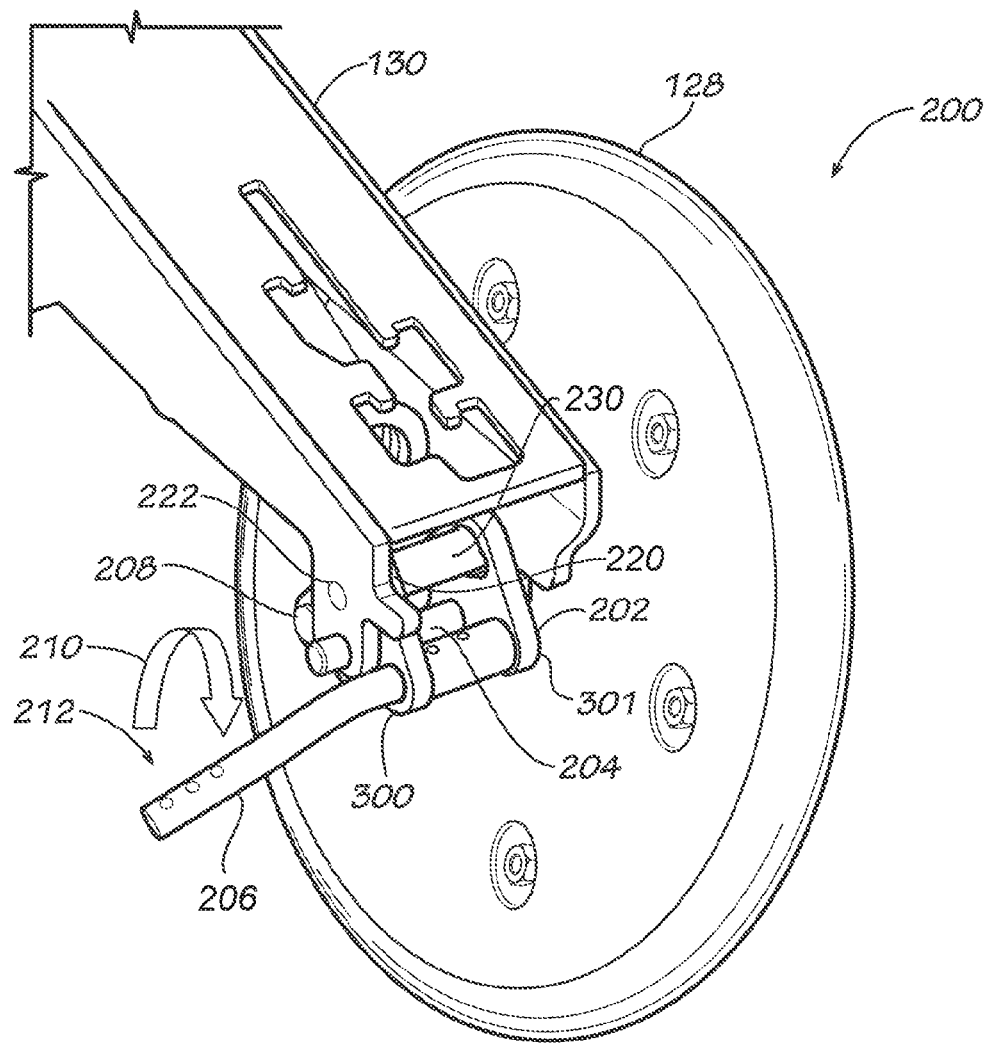
FIG. 2 shows a closing wheel equalizer assembly used with the planter of FIG. 1.
Figure 3:
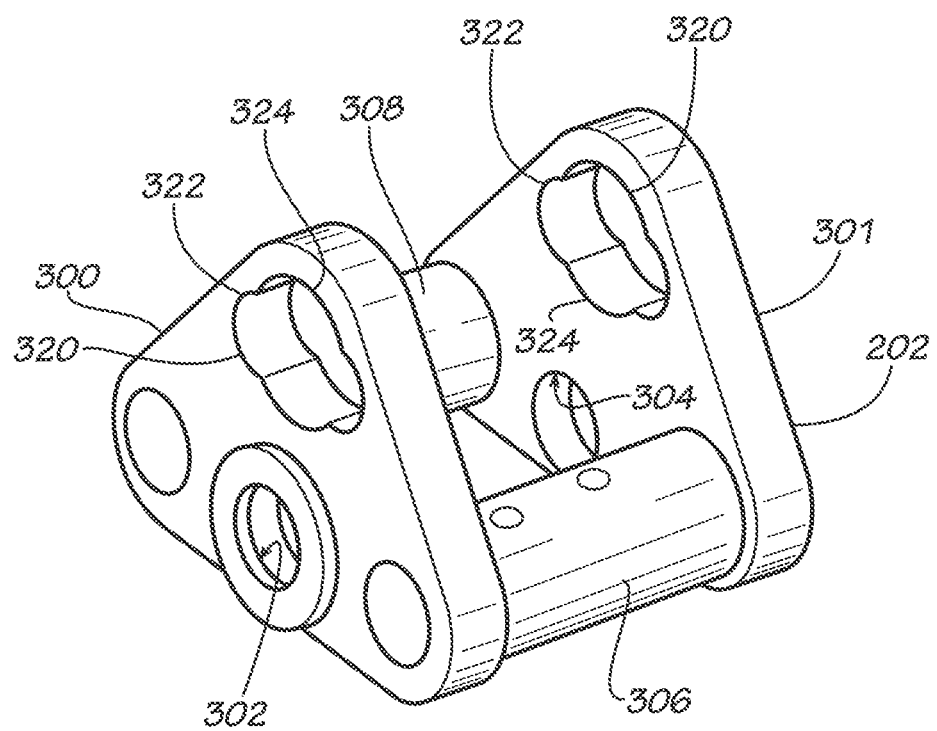
FIG. 3 shows a closing wheel equalizer bracket of the closing wheel equalizer assembly of FIG. 2.

FIG. 2 is diagram of a closing wheel equalizer assembly 200. An equalizer bracket 202 (shown in greater detail in FIG. 3) may be pivotably attached to second frame 130 at a pivot axle 204. In one embodiment, the equalizer bracket 202 may be formed of first and second sidewalls 300, 301 spaced so as to be adjacent downward tabs 203 of the second frame 130. Pivot axle 204 passes through a first opening 302 in first sidewall 300 and a second opening 304 in the second sidewall 301 of equalizer bracket 202. A first axle 206 and a second axle 208 may be connected to equalizer bracket 202 at a first axle receiver 306 and a second axle receiver 308, respectively. The first axle receiver 306 is located forward of the pivot axle 204 and the second axle receiver 308 is located aft of the pivot axle 204. First closing wheel 126 (removed in FIG. 2 for clarity) may be coupled to first axle 206 and second closing wheel 128 may be coupled to second axle 208.

Unequal forces applied to first axle 206 and second axle 208 may cause equalizer bracket 202 to pivot about pivot axle 204. For example, during operation second closing wheel 128 may hit a bump in a field and cause equalizer bracket 202 to pivot as indicated by arrow 210. As equalizer bracket 202 pivots, it may cause first closing wheel 126 and second closing wheel 128 to apply an equal force to a furrow. In other words, as equalizer bracket 202 pivots, it may equally distribute a downward force applied by second frame 130 to first closing wheel 126 and second closing wheel 128.

In one embodiment, a lock pin 220 may be used to prevent equalizer bracket 202 from pivoting. In the illustrated embodiment, the lock pin 220 is held in lock-pin holes 222 in the tabs 203 of the second frame 130 and also passes through aligned lock-pin openings 320 in the first and second sidewalls 300, 301 of the equalizer bracket 202. The lock pin openings 320 desirably have a shape comprising an elongated slot 322 with a larger-diameter center hole 324. During pivoting operations, the lock pin 220 slides in the elongated slot 324 as the equalizer bracket 202 pivots about the pivot axle 204. When it is desired to lock the equalizer bracket 202, at least one sleeve 230 on the lock pin 220 is moved into the larger center hole 322 in one or both of the first and second sidewalls 300, 301. The sleeve 230 has a diameter sized to fit into the larger center hole 324 but too large to fit into the elongated slot 322. Thus, with the sleeve 230 inserted into the lock pin openings 320, the sleeve 230 mounted on the lock pin 220 prevents equalizer bracket 202 from pivoting about the pivot axle 204. When it is desired to permit the equalizer bracket 202 to pivot, the sleeve 230 is moved inward along the lock pin 220 out of the lock pin opening 320 and secured between the first and second sidewalls 300, 301.

A biasing device may provide resistance to pivoting exhibited by the equalizer bracket 202. For example, springs, shocks, or other dampening devices may be used to bias the rotation of the equalizer bracket 202. In one embodiment, a torsion spring may be mounted on the pivoting axle 204. In addition, the biasing device may be controllable such that a user may adjust the resistance to rotation of the equalizer bracket 202. For instance, during operation, a user may increase the resistance applied by an actuator and thereby reduce the amount of travel exhibited by equalizer bracket 202.

First axle 206 may comprise a plurality of mounting locations 212 for mounting first closing wheel 126 to first axle 206. Second axle 208 may also comprise a substantially similar plurality of mounting locations (not shown) for mounting second closing wheel 128. First closing wheel 126 and second closing wheel 128 may be located at differing positions along their respective axles 206, 208. For example, first axle 206 and second axle 208 each may have three different locations 212 at which first closing wheel 126 and second closing wheel 128 may be located. During operation first closing wheel 126 may be located in a first position and second closing wheel 128 may be located in a third position. The differing positions may cause first closing wheel 126 to be spaced further from second frame 130 than second closing wheel 128. The differential in spacing may cause first closing wheel 126 to generate a greater downward force on the ground than second closing wheel 128.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A furrow closing apparatus for use with an agricultural planter that opens a furrow in the ground and deposits seeds in the furrow as the planter moves in a forward direction of travel over the ground, the furrow closing apparatus comprising:
    a frame attached to the planter;
    first and second closing wheels rotatably mounted on respective first and second closing wheel axles;
    a pivot axle extending from first and second sides of the frame generally transverse to the direction of travel of the planter;
    an equalizer bracket pivotably connected to the pivot axle, the equalizer bracket receiving the first closing wheel axle in a position aft of the pivot axle and receiving the second closing wheel axle in a position forward of the pivot axle such that the equalizer bracket pivots as the closing wheels traverse uneven ground to cause the first closing wheel and the second closing wheel to apply a substantially equal force in closing the furrow, the equalizer bracket comprising first and second sidewalls, wherein each of the first and second sidewalls has a lock pin opening having a shape comprising elongated slot portions and a larger-diameter center hole portion in between the elongated slot portions; and
    a lock pin having a sleeve along a portion of the lock pin, the sleeve having a diameter sized to fit into the larger center hole portions but too large to fit into the elongated slot portions of the lock pin openings in the first and second sidewalls, the lock pin passing through aligned openings in the first and second sides of the frame and also passing through the pin openings in the first and second sidewalls of the equalizer bracket, wherein the lock pin is configured to lock the equalizer bracket by moving the sleeve such that the sleeve is positioned in the larger center hole portion in at least one of the first and second sidewalls.

2. The apparatus of claim 1, wherein the lock pin can be positioned to permit the equalizer bracket to pivot by moving the sleeve inward along the lock pin out of the lock pin opening and securing the sleeve between the first and second sidewalls.

3. The apparatus of claim 1, wherein the equalizer bracket comprises a first axle receiver, and a second axle receiver, the first axle coupled to the first axle receiver, the second axle coupled to the second axle receiver.

4. The apparatus of claim 1, wherein the equalizer bracket is configured to equally distribute a downward force applied by the frame to the first closing wheel and the second closing wheel.

5. The apparatus of claim 1, wherein both the first axle and the second axle comprise a plurality of mounting locations for mounting the first closing wheel and the second closing wheel.

* * * * *